(12) United States Patent
Danezis et al.

(10) Patent No.: US 8,700,705 B2
(45) Date of Patent: Apr. 15, 2014

(54) SHARING OF USER PREFERENCES

(75) Inventors: George Danezis, Cambridge (GB); Tuomas Aura, Helsinki (FI); Shuo Chen, Kenmore, WA (US); Emre Mehmet Kiciman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 12/814,291

(22) Filed: Jun. 11, 2010

(65) Prior Publication Data

US 2011/0307551 A1     Dec. 15, 2011

(51) Int. Cl.
    *G06F 15/16*      (2006.01)
(52) U.S. Cl.
    USPC ............ 709/204; 709/206; 709/224; 725/109
(58) Field of Classification Search
    USPC .......................................... 709/204
    See application file for complete search history.

(56) References Cited

U.S. PATENT DOCUMENTS

| | | | |
|---|---|---|---|
| 6,928,286 B2 * | 8/2005 | Stegemann .................... | 455/447 |
| 2009/0125230 A1 * | 5/2009 | Sullivan ........................ | 701/207 |
| 2009/0132652 A1 | 5/2009 | Athale et al. | |
| 2009/0177744 A1 | 7/2009 | Marlow et al. | |
| 2009/0210246 A1 | 8/2009 | Patel et al. | |
| 2009/0265242 A1 | 10/2009 | Horvitz et al. | |
| 2010/0005105 A1 | 1/2010 | Zhang et al. | |
| 2010/0049802 A1 | 2/2010 | Raman | |
| 2010/0107204 A1 * | 4/2010 | Foti et al. ...................... | 725/109 |

OTHER PUBLICATIONS

Kiciman, et al., "U Rank", retrieved on Apr. 12, 2000 at <<http://research.microsoft.com/en-us/projects/urank/>>, Microsoft Corporation, Microsoft Research, 2010, pp. 1-4.
Levien, "Attack Resistant Trust Metrics", retrieved on Apr. 12, 2010 at <<http://www.levien.com/thesis/compact.pdf>>, University of California at Berkeley, Doctoral Thesis, 2004, pp. 1-27.
Mislove, et al., "Exploiting Social Networks for Internet Search", retrieved on Apr. 12, 2010 at <<http://www.csd.uoc.gr/~hy554/papers/mislove-hotnets2006.pdf>>, Proceedings of Workshop of Hot Topics in Networks (HotNets), Irvine, CA, Nov. 2006, pp. 1-6.
Olson, et al., "A Study of Preferences for Sharing and Privacy", retrieved on Apr. 12, 2010 at <<http://citeseerx.ist.psu.edu/viewdoc/download?doi=10.1.64.6171&rep=rep1&type=pdf>>, ACM, Conference on Human Factors in Computing Systems (CHI), Portland, OR, Apr. 2005, pp. 1985-1988.

(Continued)

*Primary Examiner* — Hua Fan
(74) *Attorney, Agent, or Firm* — Pablo Tapia; Jim Ross; Micky Minhas

(57) ABSTRACT

Sharing of user preferences is described. In an embodiment a user preference associated with a user is shared with a group of users in order to improve the relevance of results they receive. A database is used to store information detailing a number of groups of users extracted from a social network graph, where the social network graph describes connections between users. On receipt of a user preference associated with a user, a group of users containing the user is selected and the user preference is then shared with everyone in the selected group. In a further embodiment, the groups of users in the database may comprise cohesive groups of users and an extended group associated with each cohesive group. When selecting a group to share preference data with, a cohesive group containing the user is first selected and then the preference data is shared with the corresponding extended group.

17 Claims, 8 Drawing Sheets

(56) References Cited

OTHER PUBLICATIONS

Pacioli, "Summa de Aritmetica, Geometria, Proportional et Proportinalita" (translation), Manuscript circulated in Venice, 1494, pp. 1-5.
Samarati, et al., "Generalizing Data to Provide Anonymity When Disclosing Information", retrieved on Apr. 12, 2010 at <<http://protal.acm.org/citation.cfm?id=275508>>, ACM, Proceedings of Symposium on Principles of Database Systems (PODS), Seattle, WA, 1998, pp. 188.
Schild, "The (in)Visible Subject: Power, Privacy and Social Networking", retrieved on Apr. 12, 2010 at <<http://www.cis-india.org/advocacy/openness/blog/the-in-visible-subject-power-privacy-and-social-networking>>, The Centre for Internet and Society, Feb. 26, 2010, pp. 1-8.
Scott, John "Social Network Analysis", Sociology vol. 22, Feb. 1988, pp. 109-127.
Serjantov, et al., "Towards an Information Theoretic Metric for Anonymity", retrieved on Apr. 12, 2010 at <<http://www.scis.se/pepito/D1.7/papers/SD02.pdf>>, Springer-Verlag, Lecture Notes in Computer Science vol. 2482, Proceedings of Privacy Enhancing Technologies Workshop (PET), San Francisco, CA, Apr. 2002, p. 1-14.
Shamir, "How to Share a Secret", retrieved on Apr. 12, 2010 at <<http://citeseerx.ist.psu.edu/viewdoc/download?doi=10.1.1.80.8910&rep=rep1&type=pdf>>, Communications of the ACM, vol. 22, No. 11, Nov. 1979, pp. 612-613.
Sherman, "Yahoo Bolsters Personal Search", retrieved on Apr. 12, 2010 at <<http://blog.searchenginewatch.com/050426-200000>>, Apr. 26, 2005, pp. 1.
Acquisti, et al., "Imagined Communities Awareness, Information Sharing, and Privacy on the Facebook", retrieved on Apr. 12, 2010 at <<http://petworkshop.org/2006/preproc/preproc_03.pdf>>, Workshop on Privacy-Enhancing Technologies (PET), Cambridge, UK, Jun. 2006, pp. 36-58.
Byun, et al., "Efficient k-Anonymization Using Clustering Techniques", retrieved on Apr. 12, 2010 at <<http://citeseerx.ist.psu.edu/viewdoc/download?doi=10.1.1.83.5149&rep=rep1&type=pdf>>, Springer-Verlag Berlin, Proceedings of International Conference on Database Systems for Advanced Applications (DASFAA), 2007, pp. 188-200.
Castro, et al., "Secure routing for structured peer-to-peer overlay networks", retrieved on Apr. 12, 2010 at <<http://www.cs.rice.edu/~dwallach/pub/osdi2002.pdf, ACM, Proceedings of Usenix Symposium on Operating Systems Design and Implementation (OSDI), Boston, MA, Dec. 2002, pp. 299-314.
Ciriani, et al. "k-Anonymity", Secure Data Management in Decentralized Systems, vol. 33 of Advances in Information Security, Springer 2007, pp. 323-353.
Danezis, "Inferring Privacy Policies for Social Networking Services", retrieved on Apr. 12, 2010 at <<http://research.microsoft.com/en-us/um/people/gdane/papers/aisec22-danezis.pdf>>, ACM, Conference on Computer and Communications Security, Proceedings of Workshop on Security and Artificial Intelligence, (AISec), Chicago, Illinois, Nov. 2009, pp. 5-10.
Danezis, et al., "Statistical Disclosure or Intersection Attacks on Anonymity Systems", retrieved on Apr. 12, 2010 at <<http://citeseerx.ist.psu.edu/viewdoc/download;jsessionid=9BFF87D251707B897CE8ECE57080BF24?doi=10.1.1.6.2954&rep=rep1&type=pdf>>, Springer, Heidelberg, Proceedings of Workshop on Information Hiding (IH), 2004, pp. 293-308.
Danezis, et al., "Sybil-resistant DHT routing", retrieved on Apr. 12, 2010 at <<http://www.cl.cam.ac.uk/~rja14/Papers/sybildht.pdf>>, Proceedings of European Symposium on Research in Computer Security (ESORICS), Milan, IT, 2005, pp. 305-318.
Danezis, et al., "SybilInfer: Detecting Sybil Nodes using Social Networks", retrieved on Apr. 12, 2010 at <<http://www.isoc.org/isoc/conferences/ndss/09/pdf/06.pdf>>, The Internet Society, Network and Distributed System Security Symposium (NDSS), San Diego, CA, Feb. 2009, pp. 1-15.
Danezis, et al., "Vida: How to use Bayesian inference to de-anonymize persistent communications", retrieved on Apr. 12, 2010 at <<http://research.microsoft.com/en-us/um/people/gdane/papers/brinference.pdf>>, Springer-Verlag Berlin, Lecture Notes in Computer Science vol. 5672, Proceedings of International Symposium on Privacy Enhancing Technologies, Seattle, WA, 2009, pp. 56-72.
Davis, "Facebook Hit With Privacy Complaint", retrieved on Jun. 24, 2010 at <<http://www.mediapost.com/publications/index.cfm?fa=Articles.showArticle&art_aid=83769>>, MediaPost Communications, The Online Media Daily, Jun. 2, 2008, pp. 1-2.
Diaz, et al., "Towards measuring anonymity", retrieved on Apr. 12, 2010 at <<http://www.cosic.esat.kuleuven.be/publications/article-89.pdf>>, Springer-Verlag, Lecture Notes in Computer Science vol. 2482, Designing Privacy Enhancing Technologies (PET), San Francisco, CA, Apr. 2002, pp. 54-68.
Douceur, "The Sybil Attack", retrieved on Apr. 12, 2010 at <<http://citeseerx.ist.psu.edu/viewdoc/download?doi=10.1.1.17.1073&rep=rep1&type=pdf>>, Springer-Verlag London, Lecture Notes in Computer Science, vol. 2429, Revised Papers from the First International Workshop on Peer-to-Peer Systems, 2002, pp. 251-260.
Dwork, "Differential Privacy: A Survey of Results", retrieved on Apr. 12, 2010 at <<http://research.microsoft.com/en-us/projects/DatabasePrivacy/tamc_survey.pdf>>, Springer-Verlag Berlin, Lecture Notes in Computer Science vol. 4978, Proceedings of International Conference on Theory and Applications of Models of Computation (TAMC), 2008, pp. 1-19.
Haynes, et al., "Mapping Search Relevance to Social Networks", retrieved on Apr. 12, 2010 at <<http://snakdd2009.socialnetworkanalysis.info/AcceptedPapers/snakdd2009_submission_7.pdf>>, ACM, Proceedings of Workshop on Social Network Mining and Analysis (SNA-KDD), Paris, FR, Article 2, Jun. 2009, pp. 1-7.
Horling, et al., "Personalized Search for everyone", retrieved on Apr. 12, 2010 at <<http://googleblog.blogspot.com/2009/12/personalized-search-for-everyone.html>>, Google: The Official Google Blog, Dec. 4, 2009, pp. 1-6.
Kesdogan, et al., "Fundamental Limits on the Anonymity Provided by the MIX Technique", retrieved on Apr. 12, 2010 at <<http://www.cs.wisc.edu/areas/sec/kesdogan2006.pdf>>, IEEE Computer Society, Proceedings of Symposium on Security and Privacy (SP), 2006, pp. 86-99.
Shoup, et al., "Securing Threshold Cryptosystems against Chosen Ciphertext Attack", retrieved on Apr. 12, 2010 at <<http://www.shoup.net/papers/thresh1.pdf>>, Springer New York, Journal of Cryptology, vol. 15, No. 2, Dec. 2002, pp. 75-96.
Sullivan, "Eurekster Launches Personalized Social Search", retrieved on Apr. 12, 2010 at <<http://searchenginewatch.com/3301481>>, Search Engine Watch, Jan. 21, 2004, pp. 1-4.
Sullivan, "Google Relaunches Personal Search—This Time, It Really Is Personal", retrieved on Apr. 12, 2010 at <<http://blog.searchenginewatch.com/050628-073541>>, Search Engine Watch, Jun. 28, 2005, pp. 1-3.
Wasserman, et al., "Social Network Analysis: Methods and Applications", Cambridge University Press, 1994, pp. 1-19.
Yu, et al., "SybilGuard: Defending Against Sybil Attacks via Social Networks", retrieved on Apr. 12, 2010 at <<http://www.comp.nus.edu.sg/~yuhf/sybilguard-sigcomm06.pdf>>, ACM SIGCOMM Computer Communication Review, Proceedings of Conference on Computer Communications, Pisa, IT, vol. 36, No. 4, Sep. 2006, pp. 267-278.
Yu, et al., "SybilLimit: A Near-Optimal Social Network Defense against Sybil Attacks", retrieved on Apr. 12, 2010 at <<http://www.comp.nus.edu.sg/~yuhf/yuh-sybillimit.pdf>>, IEEE Computer Society, Proceedings of Symposium on Security and Privacy (SP), 2008, pp. 3-17.

* cited by examiner

SHARING OF USER PREFERENCES

BACKGROUND

Given a user query, an information retrieval (IR) system, for example a search engine, produces a ranked list of results that are most likely to satisfy a users needs and in the example of a search engine, the results may be web pages or images. In another example, the IR system may be an online shopping service and in this case the results may be suggestions of other items to buy based on a single purchase made by a user, or the IR system may be an online advertising system where the results are the advertisements displayed to a user.

To improve the relevance of the results provided, an IR system may tailor results based on the preferences of other users. For example in online shopping a user may be told 'users who bought X also bought Y'. In search applications, users may re-rank the results (or the revised rank may be inferred based on whether a user clicks on a particular link or not) and this information may be used to improve results provided to other users. There are, however, security considerations with this sharing of data. In particular, the privacy of a user (i.e. ensuring that other users do not learn about a user's exact search patterns or retrieved documents) and the quality of the shared data (i.e. ensuring that the system cannot be overly influenced by a user that maliciously injects information to manipulate the results provided).

Some IR systems use social networks to create a personalized social search which determines the ranking of documents based on the preferences within a group of friends. An example method of personalized social search allows users to designate search mates with whom they share their search preferences. Privacy is maintained by enabling a user to specify who can see their preference data and further privacy features can be provided through the ability to perform private searches, delete previous searches or through enabling opting-in or opting-out of personalized searching.

The embodiments described below are not limited to implementations which solve any or all of the disadvantages of known preference propagation systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Sharing of user preferences is described. In an embodiment a user preference associated with a user is shared with a group of users in order to improve the relevance of results they receive. A database is used to store information detailing a number of groups of users extracted from a social network graph, where the social network graph describes connections between users. On receipt of a user preference associated with a user, a group of users containing the user is selected and the user preference is then shared with everyone in the selected group. In a further embodiment, the groups of users in the database may comprise cohesive groups of users and an extended group associated with each cohesive group. When selecting a group to share preference data with, a cohesive group containing the user is first selected and then the preference data is shared with the corresponding extended group.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
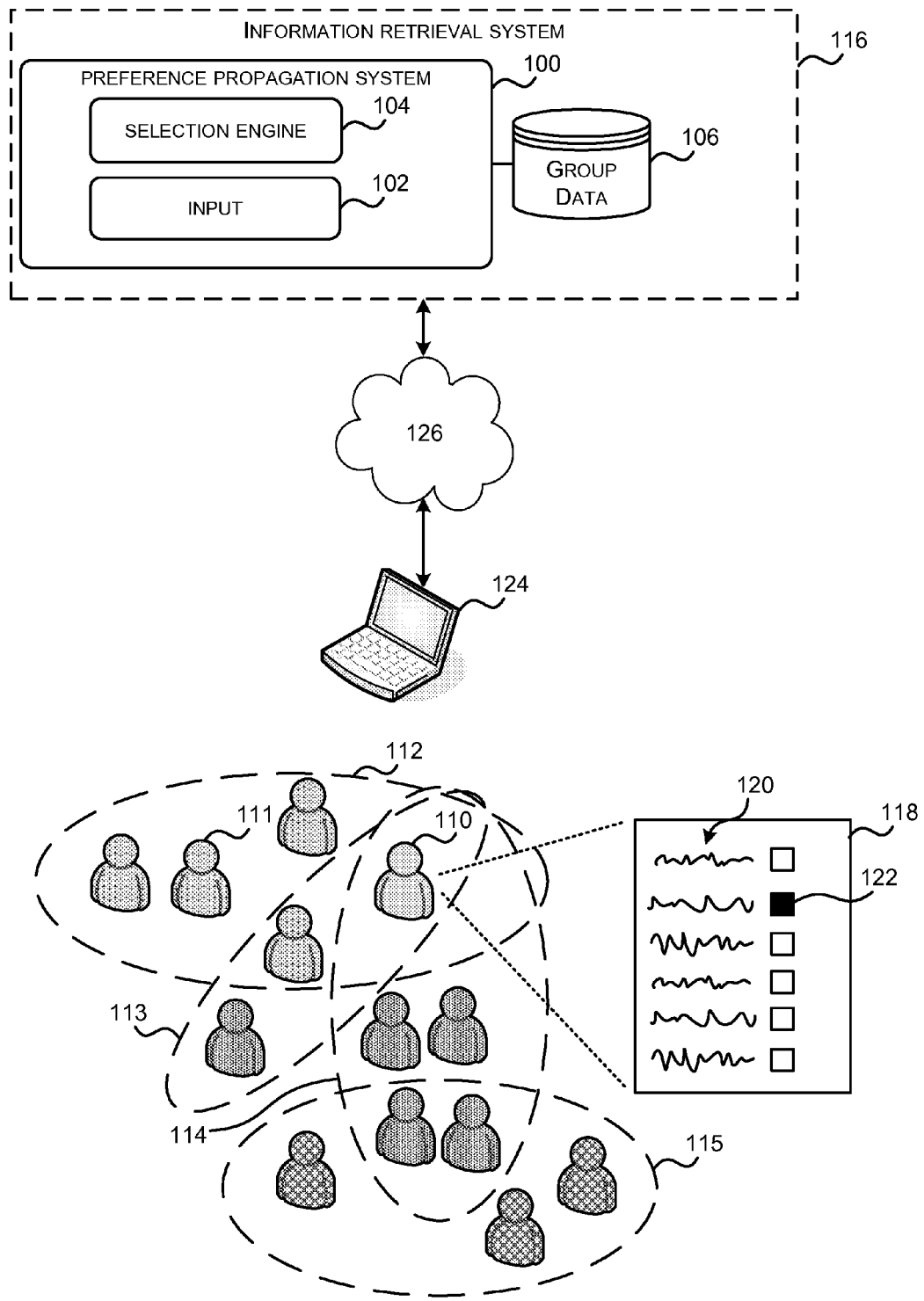
FIG. 1 is a schematic diagram of an example preference propagation system.

FIG. 1 is a schematic diagram of an example preference propagation system 100 in use and its operation can be described with reference to the example flow diagram shown in FIG. 2. The system comprises an input 102 arranged to receive a user preference associated with a user and a selection engine 104 arranged to select a target group of users with which this user preference is shared.

A user preference is used herein to refer to any piece of information that a first user could share and that could be used to customize or personalize the experience of a second user. An example of a user preference which may be shared using the system 100 is, in the context of online searching, any data which can be used to re-rank or otherwise adjust the display of search results, e.g. data which identifies a useful search result. In the context of online shopping a user preference may be an item purchased or viewed by a user and there are many other examples depending on the particular application (e.g. indications of good/bad links or spaces, ranking of gamers/applications/bookmarks or other objects etc). A user preference may be expressed explicitly by a user (e.g. through ranking search results or labeling a result as useful), or may be implied based on user behavior (e.g. purchasing an item, clicking on an advert etc).

The preference propagation system 100 has access to a data store 106 which may form part of the preference propagation system 100 or may be external to the system. This store 106 stores data defining a number of groups of users which are extracted from a social graph (also referred to as a social network graph), where a social graph defines links between users in the graph. The links between users indicate a degree of trust between users and may be generated based on friendship, family relations, chain of command etc. An example of a social graph is described in more detail below with reference to FIG. 4. The data defining a number of groups of users, which is stored in data store 106, may be referred to as 'group data' and is used by the selection engine 104 to select a target group of users. The lower portion of FIG. 1 shows a number of users, including users 110, 111, and a number of groups of users, as indicated by the dotted ellipses 112-115. Ways in which these groups may be defined are described in more detail below and in an example these groups may comprise cohesive groups, where a cohesive group comprises a group with a very high density of links between all members of the group.

The preference propagation system 100 may form part of a larger system which uses the preference information to improve the user experience, such as an information retrieval (IR) system 116. Alternatively, the preference propagation system 100 may be separate from such a system (e.g. separate from an IR system).

A user 110 uses the IR system 116, or another system, to obtain a set of results 118 in response to a query. The nature of the results may depend upon the IR system and example of IR systems include search engines, online shopping services, gaming services etc. The user 110 ranks the individual results 120 or otherwise indicates (explicitly or implicitly) a preference for one or more of the results (e.g. as indicated in this example by the filled box 122 next to one of the results in the results list 118). As a result of this user indication, the preference propagation system 100 receives an input, via input 102, which defines a user preference (block 202) and in this example, this input indicates a preference for the second result in the list 118.

The preference propagation system 100 accesses the group data (block 204) and selects a target group with which the user's preference will be shared. The target group is selected (in block 206) from a subset of possible target groups of users which include the user 110. In the example shown in FIG. 1, there are therefore three possible target groups, 112-114, which include the user 110 and one group 115 which is not part of this subset of possible target groups because it does not include user 110. The target group may be selected at random from all the possible target groups or another selection method may be used and examples of selection methods are described in more detail below.

Once a target group has been selected (in block 206), the preference data for each user in the target group is updated based on the received user preference (block 208). The preference data for a user comprises aggregated data on preferences associated with a user. This data comprises propagated preferences (e.g. preferences generated by other users and shared with the particular user) and may also comprise preferences generated by the particular user. The preference data for a user may be held centrally (e.g. by the IR system 116) or may be maintained locally (e.g. by a client running on a user's computer) and therefore updating the preference data may comprise updating stored data associated with each user in the target group or sending details of the user preference to each of the users in the selected target group.

Figure 2:
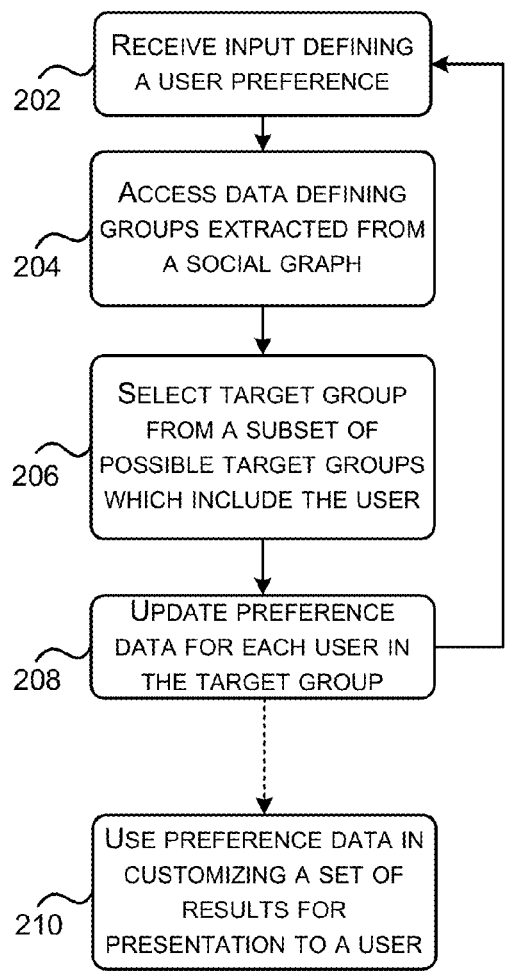
FIG. 2 is a flow diagram of an example method of operation of a preference propagation system.

The method shown in FIG. 2 (blocks 202-208) may be repeated for each user preference which is received by the system or alternatively the system could perform one target group selection (in block 206) for dissemination of more than one user preference; however this may impact privacy if the same selection is used for many user preferences, particularly where they relate to different topics.

In the example described above, the group data is held in data store 106 and therefore the data is accessed (in block 204) by accessing the data store 106. The group data in the data store 106 may be periodically updated (as described below), e.g. by extracting new groups from an updated social graph. In other examples, however, the group data may be generated on the fly from the social graph every time an input is received (in block 202) and in such an example, the system 100 may not comprise a data store 106.

The preference propagation system described above enables user preference data to be shared with a random subgroup of the user's social network whilst maintaining user privacy. The data which is shared within the target group could have originated from any member of the target group and as a user is a member of a number of different groups (as defined in the data store 106), a single user's preferences are distributed between users in their social network and another user in the target group, e.g. user 111, is unlikely to receive data on all the preferences of the particular user 110. The system operates automatically and does not require a user to manually identify those users with which they are prepared to share preference data. Having received preference data based on preferences of other users, this can be used to improve the results provided to the recipient user by the system (e.g. IR system 116) or otherwise to improve (e.g. customize or personalize) user experience (block 210).

In an example, the preference data may be used in order to rank received search results. For example it is likely that a user carrying out similar searches to other members of a cohesive group is likely to be looking for similar results. The documents which have been preferred by other members of the target group can therefore be given a higher ranking. For example where preferences are received from another user regarding a search for "golf" then a device may update the preference data and use the updated preference data to re-rank any search results.

Although FIG. 2 shows the use of the preference data in customizing a set of results for presentation to a user (block 210), it will be appreciated that this step may not be performed by the preference propagation system 100 but may be performed by a different system, e.g. the IR system 116. Subsequent flow diagrams shown in FIGS. 3 and 5 do not show this step, but it will be appreciated that they may additionally comprise using the preference data to influence a set of results which are to be displayed to a user.

The user 110 may use a PC, PDA, laptop or other computing device 124 to access the information retrieval system 116 and provide an input indicating a user preference to the preference propagation system 100 (in block 202). Any appropriate method of accessing the information retrieval system and providing an input to the preference propagation system may be used. For example the user can access the information retrieval system using a webpage or other appropriate means and the input may be provided to the preference propagation system by selecting a particular result in the list of results, checking a box on the results list, etc. Where the preference is inferred, the input indicating a user preference may be automatically generated based on user behavior (e.g. by an application running on the user's computing device 124 or on a server). The user's computing device 124 may be connected to the information retrieval system 116 and/or preference propagation system via a network 126, which may be any appropriate network. A non exhaustive list of examples of appropriate networks is: Local Area Networks (LAN), Wide Area Networks (WAN), Public Switched Telephone Networks (PSTN), the Internet and Virtual Private Networks (VPN). The network 126 may be a wireless network or a wired network or a combination thereof.

In an example the information retrieval system 116 is a web search engine which uses information on user preferences to provide a ranked list of results of documents or resources. The web search engine is of any suitable type which can receive a query from a user device and return search results which provide links to or addresses of items that are relevant to the query. The users may access the web search engine using any appropriate means, for example a web page. In this example, the list of results 118 may comprise a list of web pages. In another example, the IR system may comprise a desktop search engine.

The term "document" is used herein to refer to any item of information which may be retrieved using a query server or search engine. A non-exhaustive list of examples is: photograph, digital image, file, email message, voice mail message, short message service message, web page, part of a web page, map, electronic ink, commercial product, multimedia file, song, album, news article, advertisement, database record or a summary of one or more of these items.

The term "resource is used herein to refer to any physical or virtual component of limited availability within a computer system. A non-exhaustive list of examples is: CPU time, random access memory, virtual memory, hard disk space, network throughput, electrical power, external devices, input/output files, network connections, operations.

In another example, the preference propagation system may form part of, or be linked to, a system (which may not be an IR system) in which there is a need to receive user feedback in order to rank results, e.g. the system may be a means of sharing information about bad links or links that a user particularly likes or a rating application designed to collate user feedback on, for example, other users, items for sale or shared applications. Further example applications include viral marketing (where products are recommended to users according to whether someone socially related to them bought them), recommendation services (e.g. recommendation of restaurants, movies, video clips on YouTube, bookmarks etc), and social applications which share information between users such as bookmarks or favorites.

In an embodiment the preference propagation system 100 may be implemented at a server. The server may be a dedicated server or a shared server. The server may be a single device or a plurality of devices which may be co-located or geographically distributed. In an example the server may be located in a data center.

Figure 3:
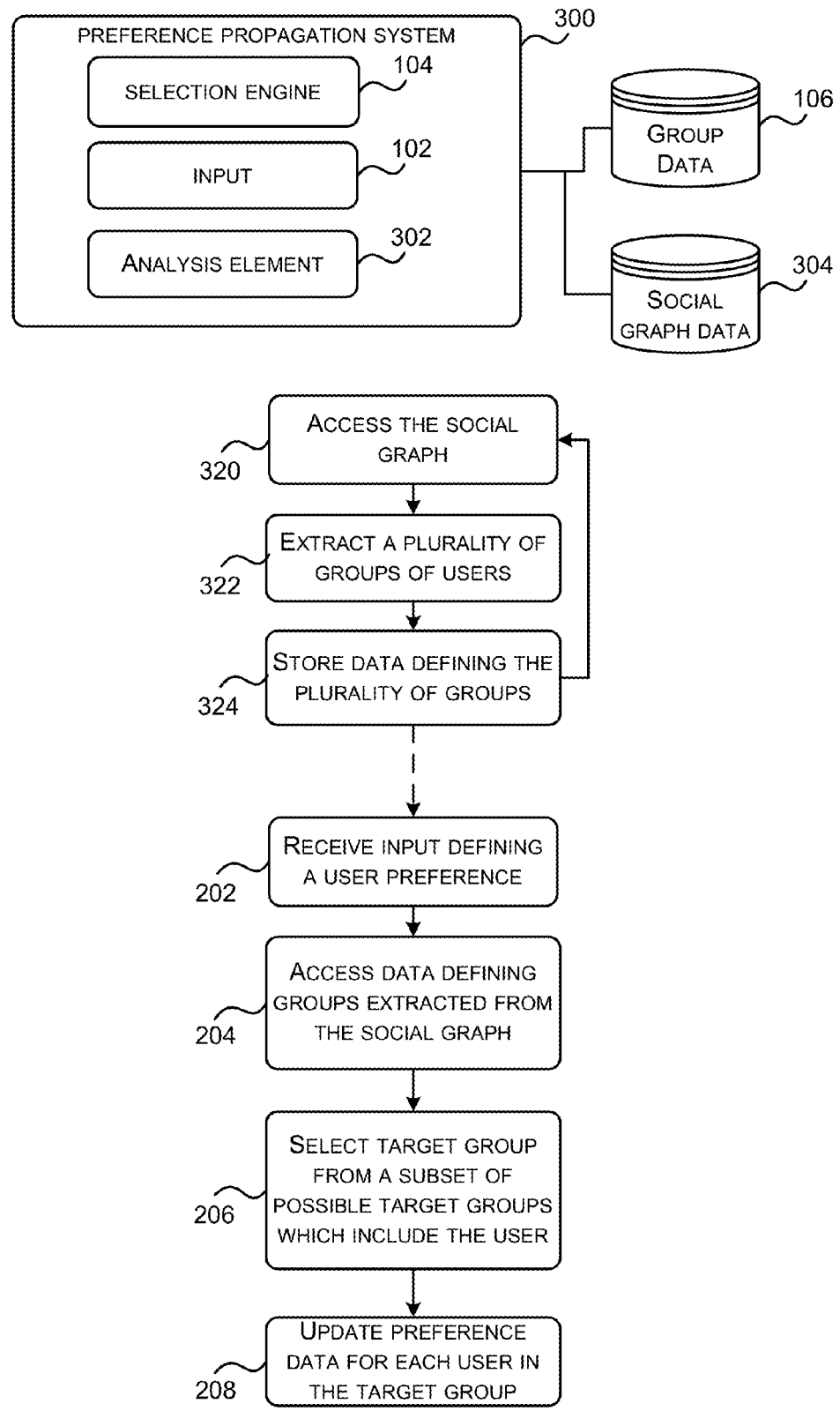
FIG. 3 shows a schematic diagram of another example preference propagation system and an example flow diagram of its operation.

FIG. 3 shows a schematic diagram of another example preference propagation system 300 and an example flow diagram of its operation. In this example, the preference propagation system comprises, in addition to an input 102 and selection engine 104, an analysis element 302. The analysis element 302 is arranged to generate the group data which is stored in the data store 106 and which, as described above, may be part of the system 300 or may be external to the system. An IR system is not shown in FIG. 3 but it will be appreciated that the preference propagation system 300 may be part of, or connected to, an IR system or other system which personalizes results provided to a user based on previous preferences which have been identified by the particular user and/or by other users.

The analysis element 302 is arranged to access social network graph data (block 320), which may for example be stored in data store 304. The analysis element 302 then extracts a plurality of groups of users from the social graph (block 322) and stores data which defines these extracted groups (block 324), e.g. in data store 106. The method may be periodically repeated using an updated social graph (in block 320) to extract and store an updated set of groups of users (in blocks 322 and 324). In another example, this method may be performed for each input defining a user preference. This first part of the flow diagram (blocks 320, 322, 324) may be referred to as a pre-computation phase.

Figure 4:
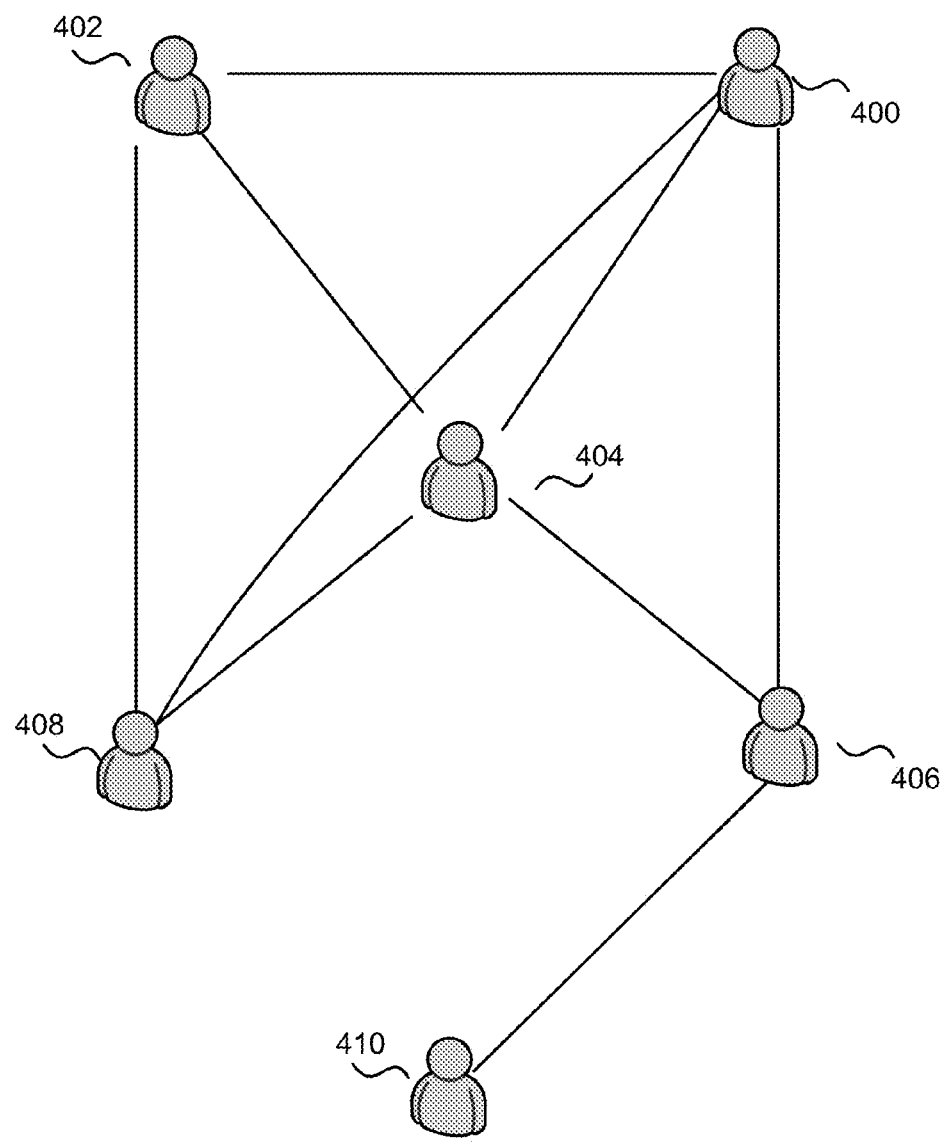
FIG. 4 is a schematic diagram of an example social network graph.

The social network graph data which is used to identify the groups of users (in block 322) represents the social graph and comprises information on users (e.g. users of an IR system) and any connections between users. The social network graph data can be stored in any appropriate format. The information stored as a social network graph can be represented schematically in the form of a graph comprising nodes connected by edges. FIG. 4 is a schematic diagram of an example social network graph and although FIG. 4 shows only a small number of users, this is by way of example only and it will be appreciated that a social graph may comprise a large number of users (e.g. hundreds, thousands or more users). A social network graph can be used to represent connections between users of the information propagation system. Users may be individuals or organizations that can make trust judgments about each other. The users are represented as nodes 400, 402, 404, 406, 408, 410 on the graph. The nodes are connected by edges which represent the connections (or links) between users. The connections between users indicate a level of trust between users and may represent relationships such as friendship, family relationships, gender, chain of command, trade relationships, political affiliations, club memberships, etc.

The social graph may be generated in any manner and in an example, the social network graph data may be formed from friends or contacts in a social networking service, instant messenger application or email application (or from any combination thereof). Some nodes in the graph may be highly connected, for example nodes 400 and 404 are connected to four other nodes. Some nodes may be connected to few nodes, for example node 410 is only connected to one other node. The feature of interconnectedness of the nodes on a social network graph can be used to preserve privacy while maximizing the benefit of information sharing in a social network.

There are many ways in which groups may be extracted from the social graph (in block 322) and in an example, the groups may be cohesive groups, where a cohesive group comprises a group with a very high density of links between all members of the group. An example definition of a cohesive group (which may also be referred to as a cohesive subgroup) is a k-plex. A k-plex is a group of N users where all of the N users have at least N−k links to all others within the group (where N and k are integers). For example, where N=5 and k=3, each of the 5 users within the group have at least N−k=2 links to other users within the group and applying this definition to the example social graph shown in FIG. 4, it can be seen that users 400, 402, 404, 406, 408 belong to this group but user 410 does not.

In some examples, a minimum size of cohesive group may be specified. Cohesive groups may be of a defined size or they may be of different sizes (i.e. N is not fixed in this example but is subject to any specified minimum). Where a minimum size is specified, the nature of a social graph may result in a user not being part of a cohesive group which satisfies the minimum size requirement and this situation it may not be possible to select a target group (in block 206) as the subset of possible target groups may comprise an empty set (as is described below with reference to FIG. 5).

Where cohesive groups of users are extracted (in block 322) these groups may be used as possible target groups or alternatively further groups may be defined in order to increase the number of users with whom preference data is shared. This increases the utility of the data whilst maintaining the privacy of the system. In such an example, a preference specified by a user may be shared with a first group of nodes, the target group, while ensuring that the preference could have been specified by any one of a second group of nodes, which may be referred to as an anonymity group. The second (or anonymity) group may overlap partially or completely with the first or target group and in an example, the second group may be a subset of the first group (as described in more detail below with reference to FIG. 5).

There are many different ways that the preference propagation system can select a target group (in block 206) from the subset of groups in the store which contain the user which generated the preference to be shared. The selection may be, for example deterministic or non-deterministic. In some examples, it may be based on a propagation policy. In an example, the propagation policy may be defined so as to preserve the privacy of users and take into account links between the users to increase the relevance of the propagated information to the target user.

In an example, directed target group selection may be used (in block 206). For example the preference propagation system may receive a preference and look at different preferences or search queries which have been received in the past. The selection engine 104 may select a group of users, from the subset of possible target groups, which appear most interested in the preference, or a characteristic of the preference, based on the history of the groups. For example in the case of a user preference submitted in relation to a set of results generated using the search term 'golf', a target group may be selected from the subset of possible target groups based on which possible group comprises users who have previously looked for similar terms or who have previously shared similar preference data. In this example, the search term itself may be considered the characteristic of the preference which is used in selecting a group using directed target group selection. In another example, another characteristic of a preference may be used (e.g. in an online shopping application, the user preference may indicate a purchase of a particular type of shoes, and the category 'shoes' may be used as the characteristic in performing directed target group selection).

In another example, the target group may be chosen randomly (or substantially at random) from the plurality of possible target groups. In a variation of this random selection, the target group may be selected from the possible target groups based on a pseudo-random function and a secret key. In this example the target group is chosen randomly from possible target groups for each new user preference, p, received from a particular user, u. However, if the selection is repeated for the same parameters (i.e. for the same p and u) the target group will not change. This enables the selection to be performed in a distributed manner, e.g. across multiple computing devices (e.g. across multiple servers), whilst ensuring that each device (e.g. each server) selects the same target group for a particular user and preference combination (which may be referred to as a 'u,p pair') without the need for communication between devices. This therefore provides a solution which can accommodate failure of a device (such as a server) on which the system is running and is easily scalable (e.g. by adding additional servers to the system) if the number of preferences received or the number of users becomes very large.

As described above, having shared the user preference and updated a user's preference data (in block 208), the preference data can be used to improve subsequent results which are provided to that user (as in block 210 of FIG. 2 and not shown in FIG. 3). In some examples, a user's preference data may have two parts: a set of initial preferences (i.e. preferences which were generated by that user), which may remain secret to the user, and propagated preferences (i.e. preferences received from the preference propagation system) which are considered public. When performing subsequent information retrieval, just the propagated preferences or both the propagated preferences and the initial preferences may be used to improve the results which are provided to a user. In some examples, the initial preferences may be deleted once the preference data for all users in the target group has been updated (in block 208) and this may increase the privacy of the system.

Through selection of a target group that is by some measure close to the source user, propagated preferences are relevant to the group. This may result in more effective use of the preference information and there may be increased spam resistance because spammers or other malicious users are less likely to be highly connected to groups of legitimate users. A non-exhaustive list of factors which may be used to determine the closeness of the target group to the source is: the number of connections between the target group and the source, similarity of behavior of the target group and source, any other appropriate measure may be used.

Where the group data is periodically updated based on updated social graph data (as indicated by the arrow from block 324 to block 320 in FIG. 3), any previous propagated preferences are not re-propagated according to the new group data, but instead the new data is used going forward, e.g. for subsequent iterations of the preference propagation phase (blocks 202-208 in FIG. 3).

Figure 5:
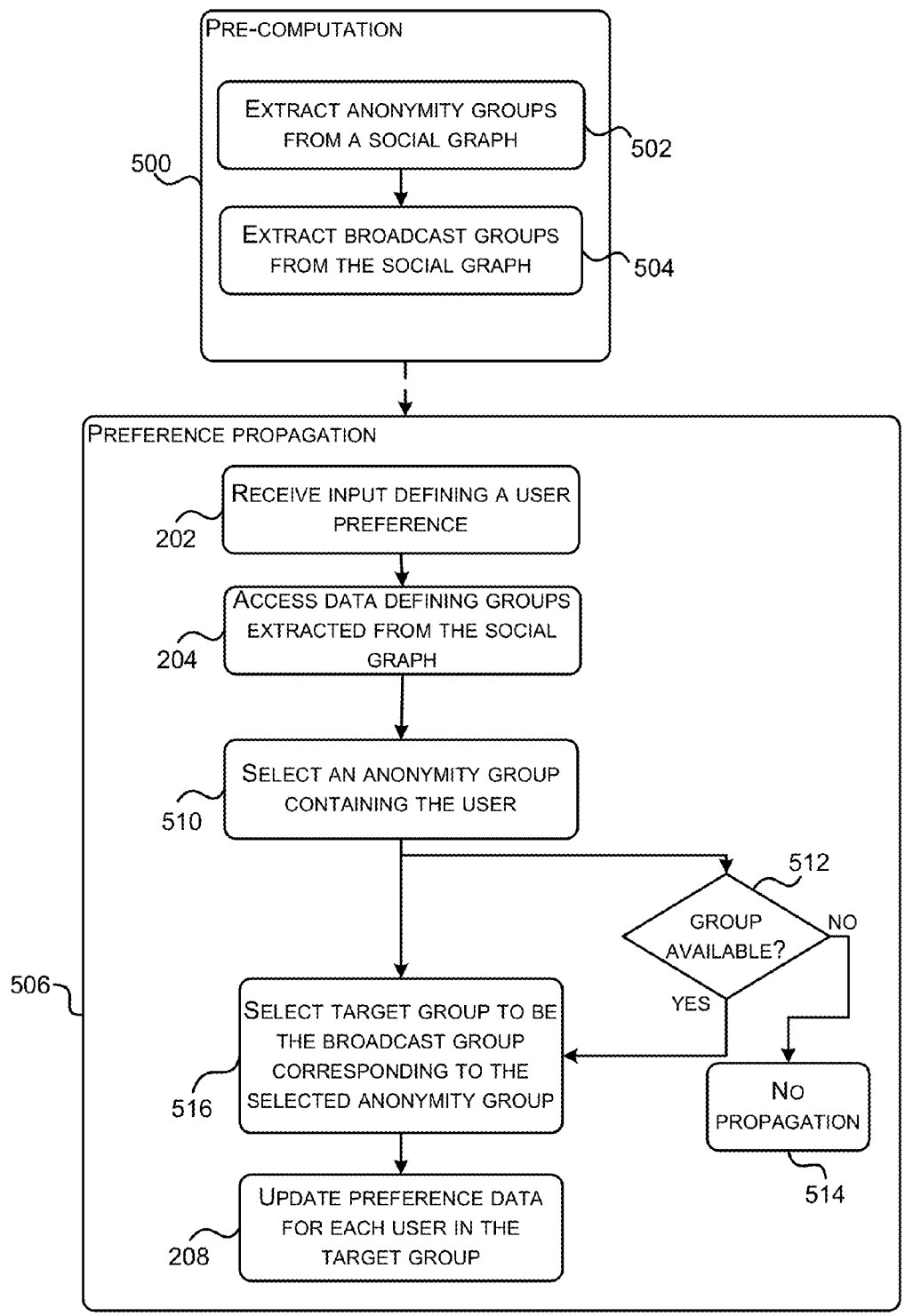
FIG. 5 is a flow diagram of another example method of preference propagation.

FIG. 5 is a flow diagram of another example method of preference propagation which preserves user privacy and which may be carried out at an appropriate computer-implemented information propagation system as described herein (e.g. system 100 as shown in FIG. 1 or system 300 as shown in FIG. 3). The method shown in FIG. 5 comprises pre-computation (block 500) to extract a plurality of groups which can then be used in preference propagation (block 506). The pre-computation (block 500) may be carried out by an analysis element 302 or by any other appropriate apparatus and the preference propagation (block 506) may be carried out by a selection engine 104 or other appropriate apparatus. In an example, a preference propagation system may only perform the preference propagation (in block 506) and not the pre-computation (block 500). In such an example, the pre-computation (block 500) may be performed by a separate entity and the preference propagation system may use group data generated by the separate entity and stored in a data store accessible by the preference propagation system (e.g. data store 106).

The pre-computation (block 500) comprises extraction of anonymity groups (block 502) and an anonymity group may comprise a cohesive group such as a k-plex. The parameters k, defining how many links can be missing within a k-plex as well as s the minimal size of the k-plex may be defined to give appropriate quality and privacy. In an example a k-plex may be a clique (which is a special case for k=1); however, a k-plex of any appropriate order may be used. The extraction of anonymity groups (in block 502) does not need to be exhaustive, but instead a set of k-plexes may be extracted for each user to ensure that all users that share a cohesive group (e.g. a k-plex) with a particular user could receive preferences from that user. In such an example, a set of k-plexes may be extracted for each user that contains at least all neighbors of each node which share a k-plex with the user.

In order to propagate the preference to a larger number of users a set of broadcast groups can additionally be extracted (in block 504). Each broadcast group is associated with an anonymity group and in an embodiment, a broadcast group comprises users with links to a minimum number, T, of users within the associated anonymity group. The value of parameter T may be set appropriately and in an example, s>2 k and T>1 (e.g. k=2, s=8 and T=2). The broadcast group may include some or all of the users from the associated anonymity group or the two groups may not overlap. In the situation where the broadcast group includes all the members of the associated anonymity group, the broadcast group may alternatively be referred to as an extended social group corresponding to the anonymity group and the propagation policy is reflexive in the sense that each user is in all of its own propagation targets.

In some embodiments the pre-computation (in block 500) is performed periodically depending on how often the social graph changes. For example if the social graph does not change frequently then the pre-computation may be carried out every few days or weeks. However, if the social graph is regularly changing the pre-computation can be carried out more often. For example some users may not add friends to their social graph very regularly and therefore the set of users may not change very frequently. Other users may frequently add or delete friends from their social graph. In other embodiments the pre-computation may be carried out every time that a preference is to be shared. For example the pre-computation may be carried out on a just in time basis or on any other appropriate basis.

Preference propagation (in block 506) can be carried out to members of the anonymity group and the broadcast group. A user preference is received (block 202) and data defining the groups extracted from the social graph (in block 500) is accessed (block 204) so that an anonymity group (e.g. a k-plex) containing the user can be selected (block 510). As described above in relation to block 206, the selection may be performed in any manner and the data accessed (in block 204) may be stored in a data store 106 or elsewhere or may be generated on the fly. In an example where group selection is directed, the anonymity group may be selected based on a characteristic of the preference (e.g. the subject matter or search term) and the history of the groups (e.g. their past behavior). In an example, the anonymity group may be selected from those possible anonymity groups which include the user which comprises a group of users which have previously acted in a similar manner or shown interest in a similar preference or search query. In other examples the selection process may be random or pseudo-random.

Dependent upon the anonymity criteria used (e.g. the value of the minimum size of k-plex, s), there may be situations where no anonymity group is available which satisfies the anonymity criteria ('No' in block 512) then no propagation of results takes place (block 514). Any appropriate criteria may be used to determine if the anonymity group is appropriate for propagation to take place. In other examples, this check may not be performed (as indicated by the arrow from block 510 to block 516).

If an appropriate anonymity group is available then the target group is set as the broadcast group which corresponds to the selected anonymity group (block 516) and then the preference data for each user in the target group is updated based on the received preference (block 208).

Figure 6:
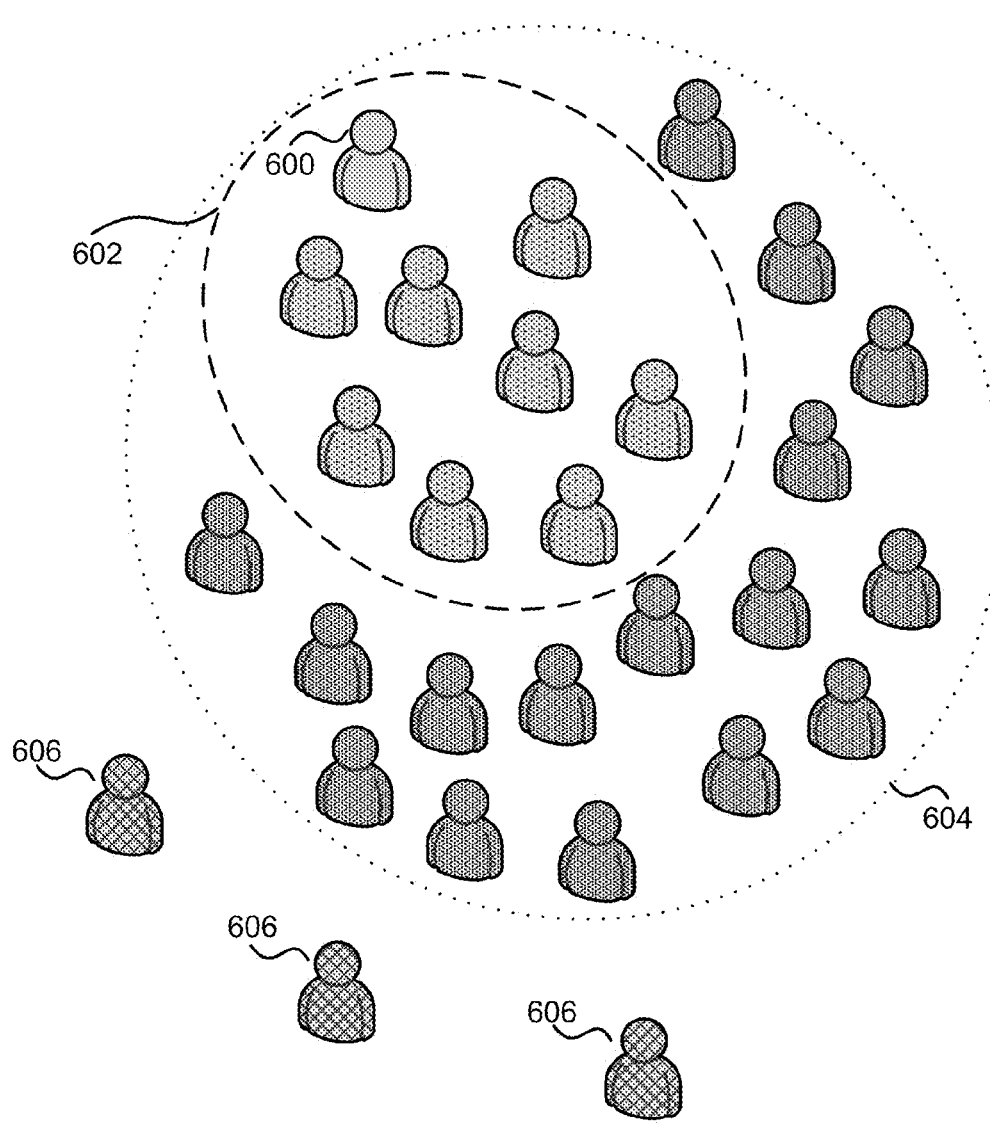
FIG. 6 is a schematic diagram of anonymity groups and extended groups.

FIG. 6 is a diagram of anonymity groups and broadcast groups which represents schematically how anonymity groups and broadcast groups can be formed from a plurality of users. A user 600 is part of social network of containing a plurality of other users. Depending upon the particular social network used, the users may be in a non-exhaustive list of examples; friends, acquaintances, colleagues, relatives or have any other connection to the first user 600. The social network may be represented as a social network graph. An anonymity set 602 can be selected from among the users in the social network graph in order to propagate preferences anonymously. In an example, the anonymity set 602 comprises a cohesive set of users.

A further group of users can be selected to be a broadcast group 604. The broadcast group comprises a set of users who have links to at least a threshold number of users in the anonymity group. In an example the threshold is two, meaning that each user in the broadcast group 604 has connections to at least two users in the anonymity group. In other embodiments the broadcast group may be selected using other criteria. The anonymity group 602 and the broadcast group 604 form a set of users, described herein as the target group, to which preferences can be propagated anonymously. Further users on the social graph may not form part of the anonymity group or the broadcast group for a preference and therefore do not receive the information. However, the other users may form part of at least one further anonymity group or broadcast group. A user can be in any number of appropriate groups.

Although the above description provides example definitions of the broadcast group, in other examples, different definitions may be used and these different definitions may provide different quality and spam resistance trade-offs.

Figure 7:
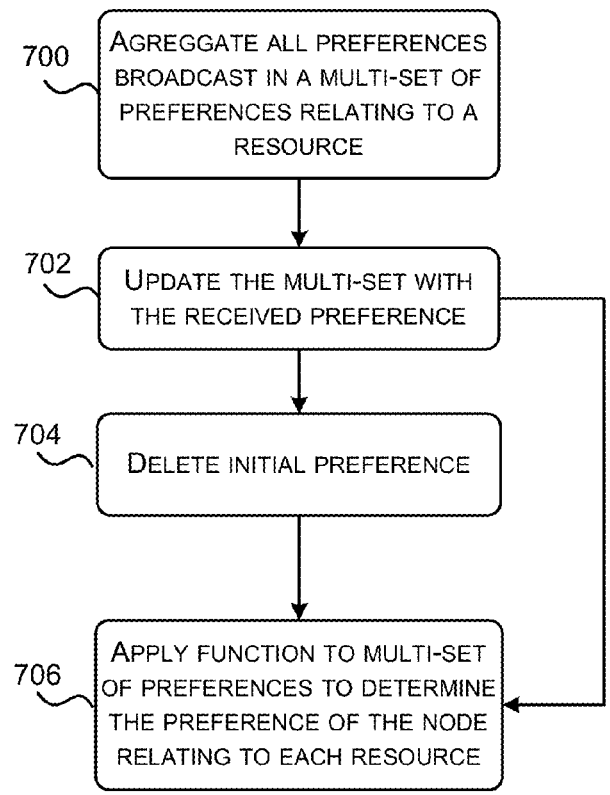
FIG. 7 is a flow diagram of preference aggregation at a node.

FIG. 7 is a flow diagram of an example method preference aggregation and subsequent use of the preferences at a device. The first part of this method (blocks 700, 702, 704) may be used to update user preference data (e.g. as in block 208 in FIGS. 2, 3 and 5). The method, or parts thereof, may be performed by the preference propagation system, the IR system or another system. All preferences broadcast in a multi-set of preferences $P_{vi}$ relating to a resource i are aggregated (block 700) at a device, where the multi-set is used to record one or more preferences associated with a resource and may contain duplicate elements, although their order does not matter. In an example, a multi-set of preferences for a particular resource may comprise {|like, like, . . . , dislike, dislike|}. Each broadcast updates the multi-set with the received preference $P'_{vi}=\{f(i,u)\}$ â $P_{vi}$ (block 702). Once the multi-set has been updated with the propagated preference the initial preference stored at a device may be forgotten (block 704), although this block may be omitted, as indicated by the arrow from block 702 to block 706. Having updated the multi-set, the data may be used to improve results provided to the user. In the example shown, a function can then be applied (in block 706) to the multi-set of preferences to determine the final preference of the device node relating to a resource $g(i,v)$. The function may be any appropriate function used to determine ranking. In some embodiments described herein preference aggregation may be carried out separately at each device connected to the preference propagation system. In other embodiments the preference aggregation may be carried out centrally. For example the preference propagation system may propagate preferences.

As shown in FIG. 7, in some embodiments the device forgets the original preference (in block 704) in order to provide increased security and this may mean that it may not be possible to determine where a preference originated. However, other embodiments may retain the initial preferences or it may be possible for a user to choose to retain their original preferences.

Through use of k-plexes of a minimum size as target groups or as anonymity groups, as described above, the target groups can be infiltration resistant. Users (or nodes) in the system may be categorized as being in one of three categories: honest users genuinely share their preferences; dishonest users try to propagate spam preferences to honest nodes; and misguided users genuinely share their preferences but have created friendship links with dishonest users. In order to share a k-plex of minimum size $s_a$ with $s_a$ dishonest users (and therefore have their privacy totally compromised, a misguided user has to make $s_a$-k+1 bad friends (i.e. friends with dishonest users). Honest users with mostly honest friends will not find themselves in a k-plex dominated by dishonest users because the dishonest users need to create a lot of links with misguided users before they will form part of the k-plex.

The preference propagation methods described herein also limit the potential for the propagation of spam. Spam may propagate from dishonest users to misguided users but propagation to honest users can be limited by selection of the target groups based on social network graph data. A simple 1-hop algorithm in which users only broadcast their preference to their neighbors achieves this result. However, it limits the number of users that could benefit from shared preferences. A 2-hop algorithm, in which preferences are also broadcast to all neighbors of neighbors, increases the reach of the shared preferences but also makes it more likely that users receive spam. A preference propagation algorithm as described above with reference to FIG. 5 affects a wider circle of nodes than a 1-hop algorithm but the probability a user receives a large amount of spam preferences as in a 2-hop algorithm can be reduced. Using the preference propagation method described above dishonest users connected to misguided users can only spam the system when acting in a coordinated way. Adversaries need to form cohesive groups between themselves and the users to broadcast their preferences. In addition the cohesive groups of adversaries would need to map to the groups selected for preference propagation. It is unlikely that this would readily occur.

The use of k-plexes of a minimum size as target groups or as anonymity groups, as described above, also prevents the originator of a preference from being determined. The larger the anonymity the less likely it is that any particular user set a preference. A preference propagation policy preserves k-anonymity if k is less than the size of the anonymity group for all users and preferences.

The relationship between the members of the anonymity group is preferably symmetric in the sense for a given preference and target group, if u' is in the anonymity group when the real source is u then u is in the anonymity group when the real source is u'.

The privacy offered by the preference sharing algorithms described above against two types of adversaries has been analyzed. The first threat is an eavesdropper that can see the preferences output by the preference sharing algorithm for every single node in the network, but does not know the private inputs to the algorithm and tries to infer them. This information enables the eavesdropper to determine the group which contains the user (e.g. the anonymity group) and therefore the probability that a particular user set a preference is given by $1/s_a$, where $s_a$ is the minimum group size (as set out above). The larger the value of $s_a$ the larger the anonymity provided.

The second threat is a curious coalition of a user's friends that wants to infer what that user's preferences are. The system described herein provides protection against such a situation and coalitions of fewer than $s_a$-1 users will fail to attribute a preference with certainty to a single user. This is a very strong result that sets a lower bound on the size of the conspiracy. Additionally, whilst a coalition of at least $s_a$-1 nodes can fully de-anonymize a preference, this is not sufficient to perform an actual attack. In order to achieve this, the coalition has to coincide exactly with the members of the cohesive group used as an anonymity group to broadcast the preference. This places additional restrictions and difficulties in creating such a malevolent coalition.

Figure 8:
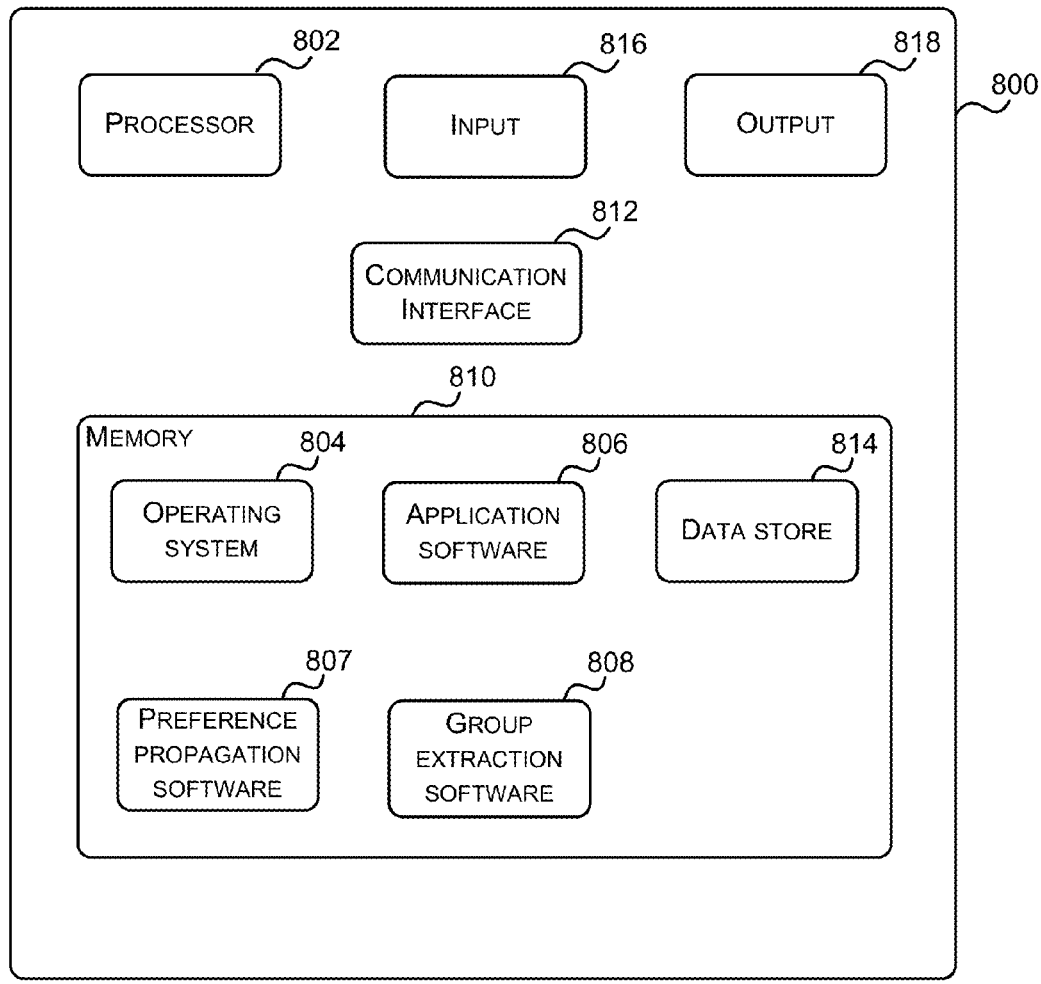
FIG. 8 illustrates an exemplary computing-based device in which embodiments of a preference propagation system may be implemented.

FIG. 8 illustrates various components of an exemplary computing-based device 800 which may be implemented as any form of a computing and/or electronic device, and in which embodiments of a preference propagation system as described herein may be implemented. In an example, the computing-based device 800 may be a server.

Computing-based device 800 comprises one or more processors 802 which may be microprocessors, controllers or any other suitable type of processors for processing computing executable instructions (also referred to as computer program code) to control the operation of the device in order to carry out information propagation. Platform software comprising an operating system 804 or any other suitable platform software may be provided at the computing-based device to enable application software 806-808 to be executed on the device. The application software comprises preference propagation software 807 which is arranged to select a target group and update preference data and may also comprise group extraction software 808 arranged to extract a plurality of groups from social graph data.

The computer executable instructions may be provided using any computer-readable media, such as memory 810. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 800 it will be appreciated that the storage may be distributed or located remotely and accessed via a network or other communication link (e.g. using communication interface 812). The memory 810 may also comprise a data store 814 for storing group data, which may be generated by the group extraction software 808 or by another device.

The computing-based device 800 further comprises one or more inputs 816 which are of any suitable type for receiving user preferences and may also be suitable for receiving media content, Internet Protocol (IP) input, text input, social network graph data or any other appropriate input. An output 818 may also be provided which may be used in broadcasting preference data, providing improved results to a user based on the updated preference data and/or providing an audio and/or video output to a display system integral with or in communication with the computing-based device. The display system may provide a graphical user interface, or other user interface of any suitable type although this is not essential.

Although the present examples are described and illustrated herein as being implemented in a web search system, the system described is provided as an example and not a limitation. As those skilled in the art will appreciate, the present examples are suitable for application in a variety of different types of systems and in particular in any system which collects user preferences, aggregates them centrally or locally on a social graph, does some processing operation on the aggregate and returns the result or influences the output to users. Further example applications are described below.

In another example application, users may rate other users of an online gaming platform. In an example, members of a cohesive group are likely to be of a similar standard and to share similar preferences to other members of the target group. Players can therefore be re-ranked according to the preferences of other members of the target group in order to improve the utility of the rankings provided to a member of the target group.

In another example application, users may rate resources in a distributed computing system. For example users may rate an FTP server based on load and transfer speed. However, the user may be able to rank any appropriate resource. The availability of resources to a further user may then be re-ranked accordingly.

In yet another example application, the user preference data may indicate a television channel (or programme) currently being watched by a user and the aggregated preference data may comprise such information for multiple users and be displayed to users in an electronic programme guide. Further example applications include online shopping, where preferences may relate to purchases and be used to determine purchasing suggestions to other users, and online advertising, where other user's activity (e.g. what they bought, what advertisements they clicked on, etc) may be used to select advertisements for display to a user.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of sharing user preference data, the method comprising:
   receiving an input defining a user preference associated with a user, the user preference indicating a preference of the user for one or more results previously received in response to a query;
   accessing, by one or more computer processors, data defining a plurality of groups of users extracted from a social graph;
   selecting, by the one or more computer processors, a target group from a subset of the groups of users based at least in part on the user preference, each group within the subset including the user,
   wherein selecting the target group comprises selecting the target group at random from the subset of the groups of users, each group within the subset including the user,
   wherein the selecting the target group at random comprises using a pseudorandom function with a secret key; and
   automatically updating, by the one or more computer processors, preference data for each user in the target group based on the user preference.

2. A method according to claim 1, further comprising:
   repeating the selecting and updating steps on receipt of each input defining a user preference.

3. A method according to claim 1, wherein the selecting the target group comprises:
   selecting the target group from the subset of groups of users based at least in part on a characteristic of one or more previously received user preferences associated with the groups within the subset.

4. A method according to claim 1, further comprising:
   accessing the social graph;
   analyzing the social graph to extract the plurality of groups of users from the social graph; and
   storing the data defining the plurality of groups of users in a data store.

5. A method according to claim 4, wherein each of the plurality of groups of users comprises at least a minimum number of users.

6. A method according to claim 4, wherein the social graph is generated from a social networking service.

7. A method according to claim 4, wherein the analyzing the social graph to extract the plurality of groups of users from the social graph comprises:
analyzing the social graph to extract a plurality of cohesive groups of users from the social graph.

8. A method according to claim 7, wherein a cohesive group comprises a group of N users where each user within the cohesive group has at least N−k links to other users within the cohesive group, where N and k are integers and k is the same for each cohesive group.

9. A method according to claim 7, wherein the analyzing the social graph to extract the plurality of groups of users from the social graph further comprises:
analyzing the social graph to identify an extended social group associated with each cohesive group of users; and
wherein the selecting the target group from the subset of the groups of users comprises:
selecting a cohesive group including the user; and
selecting as the target group, the extended social group associated with the selected cohesive group.

10. A method according to claim 9, wherein an extended social group comprises users in the associated cohesive group and users having links to at least a minimum subset of users within the associated cohesive group.

11. A method according to claim 1, further comprising: using the preference data to customize a set of results for presentation to a user.

12. An apparatus comprising:
one or more processors configured to receive a user preference associated with a user, the user preference indicating a preference of the user for one or more results previously received in response to a query;
one or more memories to store instructions executable by the one or more processors;
a database, stored in the one or more memories, to store data defining a plurality of groups of users extracted from a social graph;
a selection element, stored in the one or more memories and executable by the one or more processors, to select a target group including the user from the plurality of groups based at least in part on the user preference and to update preference data associated with each user within the target group,
wherein selecting the target group comprises selecting the target group at random from the subset of the groups of users, each group within the subset including the user,
wherein the selecting the target group at random comprises using a pseudorandom function with a secret key.

13. An apparatus according to claim 12, wherein the data defining the plurality of groups of users comprises data defining a plurality of cohesive groups of users and an extended social group associated with each cohesive group and wherein the selection element is further configured to select the target group by selecting a cohesive group including the user and selecting as the target group, the extended social group associated with the selected cohesive group.

14. An apparatus according to claim 12, wherein the one or more processors are further configured to receive data defining the social graph and wherein the apparatus further comprises an analysis element, stored in the one or more memories and executable by the one or more processors, to identify the plurality of groups of users from the social graph and to store the data defining the plurality of groups in the database.

15. An apparatus according to claim 14, wherein the analysis element is further configured to periodically update the plurality of groups by analyzing an updated social graph.

16. A computer implemented method comprising:
accessing, by one or more computer processors, social graph data;
extracting, by the one or more computer processors, a plurality of cohesive groups of users from the social graph data;
identifying, by the one or more computer processors, an extended social group associated with each cohesive group; and
on receipt of a user preference associated with a user that indicates a preference of the user for one or more results previously received in response to a query, selecting, by the one or more computer processors, a cohesive group including the user based at least in part on the user preference,
wherein selecting the cohesive group comprises selecting the cohesive group at random from the subset of the groups of users, each group within the subset including the user,
wherein the selecting the cohesive group at random comprises using a pseudorandom function with a secret key; and
automatically updating preference data for each user in the extended social group associated with the selected cohesive group based on the user preference.

17. A computer implemented method according to claim 16, further comprising:
storing data defining the plurality of cohesive groups and associated extended social groups in a database.

* * * * *